(12) United States Patent
Kolouri et al.

(10) Patent No.: US 12,373,706 B2
(45) Date of Patent: Jul. 29, 2025

(54) SYSTEMS AND METHODS FOR UNSUPERVISED CONTINUAL LEARNING

(71) Applicant: HRL Laboratories, LLC, Malibu, CA (US)

(72) Inventors: Soheil Kolouri, Agoura Hills, CA (US); Mohammad Rostami, Los Angeles, CA (US); Praveen K. Pilly, West Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 858 days.

(21) Appl. No.: 17/066,457

(22) Filed: Oct. 8, 2020

(65) Prior Publication Data

US 2021/0192363 A1 Jun. 24, 2021

Related U.S. Application Data

(60) Provisional application No. 62/953,063, filed on Dec. 23, 2019.

(51) Int. Cl.
*G06N 5/022* (2023.01)
*G06N 20/00* (2019.01)

(52) U.S. Cl.
CPC .......... *G06N 5/022* (2013.01); *G06N 20/00* (2019.01)

(58) Field of Classification Search
CPC ........ G06N 20/00; G06N 20/10; G06N 20/20; G06N 5/02; G06N 5/022; G06N 5/04
See application file for complete search history.

(56) References Cited

U.S. PATENT DOCUMENTS

| | | | |
|---|---|---|---|
| 9,875,440 B1* | 1/2018 | Commons | B60W 30/00 |
| 2019/0130257 A1* | 5/2019 | Meyerson | G06N 3/045 |
| 2020/0090045 A1* | 3/2020 | Baker | G06N 3/045 |
| 2021/0110205 A1* | 4/2021 | Karimi | G06V 30/32 |

OTHER PUBLICATIONS

Shin et al. "Continual Learning with Deep Generative Replay", 2017 https://proceedings.neurips.cc/paper/2017/file/0efbe98067c6c73dba1250d2beaa81f9-Paper.pdf (Year: 2017).*

(Continued)

*Primary Examiner* — Usmaan Saeed
*Assistant Examiner* — Paul J Breene
(74) *Attorney, Agent, or Firm* — TOPE-MCKAY & ASSOCIATES

(57) ABSTRACT

Described is a system for continual adaptation of a machine learning model implemented in an autonomous platform. The system adapts knowledge previously learned by the machine learning model for performance in a new domain. The system receives a consecutive sequence of new domains comprising new task data. The new task data and past learned tasks are forced to share a data distribution in an embedding space, resulting in a shared generative data distribution. The shared generative data distribution is used to generate a set of pseudo-data points for the past learned tasks. Each new domain is learned using both the set of pseudo-data points and the new task data. The machine learning model is updated using both the set of pseudo-data points and the new task data.

15 Claims, 8 Drawing Sheets

(56) References Cited

OTHER PUBLICATIONS

Wu et al. "Sliced Wasserstein Generative Models", 2018 https://arxiv.org/pdf/1706.02631v3.pdf (Year: 2018).*
Kolouri et al. "Sliced Wasserstein Distance for Learning Gaussian Mixture Models", 2018 https://ieeexplore.ieee.org/abstract/document/8578459 (Year: 2018).*
Rao et al. "Continual Unsupervised Representation Learning", 2019 https://proceedings.neurips.cc/paper/2019/file/861578d797aeb0634f77aff3f488cca2-Paper.pdf (Year: 2019).*
"Continual Learning with Deep Generative Replay," Shin et al(Year: 2017).*
"Sliced Wasserstein Generative Models," (Year: 2017).*
"Iterative Machine Learning: A step towards Model Accuracy," Packt, Bodarjee (Year: 2017).*
Notification of the International Preliminary Report on Patentability Chapter I for PCT/US2020/054872; date of mailing Jul. 7, 2022.
The International Preliminary Report on Patentability Chapter I for PCT/US2020/054872; date of mailing Jul. 7, 2022.
The International Search Report of the International Searching Authority for PCT/US2020/054872; date of mailing Feb. 8, 2021.
The Written Opinion of the International Searching Authority for PCT/US2020/054872; date of mailing Feb. 8, 2021.
Rostami, M., et al., "Generative Continual Concept Learning," arxiv.org, Cornell University Library, NY, 2019, pp. 1-8.
Rostami, M., et al., "Complementary Learning for Overcoming Catastrophic Forgetting Using Experience Replay," Proceedings of the Twenty-Eight International Joint Conference on Artificial Intelligence, 2019, pp. 3339-3345.
Lesort, T., et al., "Continual learning for robotics: Definition, framework, learning strategies, opportunities and challenges," Information Fusion, Elsevier, US, vol. 58, 2019, pp. 52-68.
Yoo, J., et al., "Domain Adaptation Using Adversarial Learning for Autonomous Navigation," arxiv.org, Cornell University Library, NY, 2017, pp. 1-20.
Nicolas Bonneel, Julien Rabin, Gabriel Peyr'e, and Hanspeter Pfister. Sliced and Radon Wasserstein Barycenters of Measures. Journal of Mathematical Imaging and Vision, 51(1): pp. 22-45, 2015.
Nicolas Bonnotte. Unidimensional and evolution methods for optimal transportation. PhD thesis, Chapter 5.1, pp. 119-125, Paris 11, 2013.
Nicolas Courty, Remi Flamary, Devis Tuia, and Alain Rakotomamonjy. Optimal Transport for Domain Adaptation. IEEE Transactions on Pattern Analysis and Machine Intelligence, 39(9): pp. 1853-1865, 2017.
Amir Globerson and Sam T Roweis. Metric Learning by Collapsing Classes. In Advances in Neural Information Processing Systems, pp. 451-458, 2006.
James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al. Overcoming Catastrophic Forgetting in Neural Networks. Proceedings of the National Academy of Sciences, 114(13): pp. 3521-3526, 2017.
Alex Krizhevsky, Ilya Sutskever, and Geoffrey E Hinton. ImageNet Classification with Deep Convolutional Neural Networks. In Advances in Neural Information Processing Systems, pp. 1097-1105, 2012.
Brenden M Lake, Ruslan Salakhutdinov, and Joshua B Tenenbaum. Human-Level Concept Learning through Probabilistic Program Induction. Science, 350(6266): pp. 1332-1338, 2015.
Yann LeCun, Bernhard E Boser, John S Denker, Donnie Henderson, Richard E Howard, Wayne E Hubbard, and Lawrence D Jackel. Handwritten Digit Recognition with a Back-Propagation Network. In Advances in Neural Information Processing Systems, pp. 396-404, 1990.
Marieke Longcamp, Marie-Therese Zerbato-Poudou, and Jean-Luc Velay. The Influence of Writing Practice on Letter Recognition in Preschool Children: A Comparison Between Handwriting and Typing. Acta Psychologica, 119(1): pp. 67-79, 2005.
James L McClelland, Bruce L McNaughton, and Randall C O'Reilly. Why There are Complementary Learning Systems In the Hippocampus and Neocortex: Insights from the Successes and Failures of Connectionist Models of Learning and Memory. Psychological Review, 102(3): pp. 419-457, 1995.
James L McClelland and Timothy T Rogers. The Parallel Distributed Processing Approach to Semantic Cognition. Nature Reviews Neuroscience, 4(4): pp. 310-322, 2003.
James L McClelland, David E Rumelhart, PDP Research Group, et al. Parallel Distributed Processing. Explorations in the Microstructure of Cognition, 2: pp. 216-271, 1986.
Michael McCloskey and Neal J Cohen. Catastrophic Interference in Connectionist Networks: The Sequential Learning Problem. In Psychology of Learning and Motivation, vol. 24, pp. 109-165. Elsevier, 1989.
Leland McInnes, John Healy, and James Melville. UMap: Uniform Manifold Approximation and Projection for Dimension Reduction. arXiv preprint arXiv:1802.03426, pp. 1-63, 2018.
Saeid Motiian, Quinn Jones, Seyed Iranmanesh, and Gianfranco Doretto. Few-shot adversarial domain adaptation. In Advances in Neural Information Processing Systems, pp. 6670-6680, 2017.
German I Parisi, Ronald Kemker, Jose L Part, Christopher Kanan, and Stefan Wermter. Continual Lifelong Learning with Neural Networks: A Review. Neural Networks, pp. 54-71, 2019.
Julien Rabin and Gabriel Peyre. Wasserstein Regularization of Imaging Problem. In 2011 18th IEEE International Conference on Image Processing, pp. 1541-1544, IEEE, 2011.
Anthony Robins. Catastrophic Forgetting, Rehearsal and Pseudorehearsal. Connection Science, 7(2): pp. 123-146, 1995.
Mohammad Rostami, Soheil Kolouri, and Praveen Pilly. Complementary Learning for Overcoming Catastrophic Forgetting Using Experience Replay. In IJCAI, pp. 3339-3345, 2019.
Paul Ruvolo and Eric Eaton. Ella: An Efficient Lifelong Learning Algorithm. In International Conference on Machine Learning, pp. 507-515, 2013.
Andrew M Saxe, James L McClelland, and Surya Ganguli. A Mathematical Theory of Semantic Development in Deep Neural Networks. Proceedings of the National Academy of Sciences, pp. 11537-11546, 2019.
Shai Shalev-Shwartz and Shai Ben-David. Understanding Machine Learning: From Theory to Algorithms, Chapter 2.2, pp. 35-36, Cambridge University Press, 2014.
Hanul Shin, Jung Kwon Lee, Jaehong Kim, and Jiwon Kim. Continual Learning with Deep Generative Replay. In Advances in Neural Information Processing Systems, pp. 2990-2999, 2017.
Jake Snell, Kevin Swersky, and Richard Zemel. Prototypical Networks for Few-Shot Learning. In Advances in Neural Information Processing Systems, pp. 4077-4087, 2017.
Mark A. Kramer. Nonlinear Principal Component Analysis Using Autoassociative Neural Networks. AIChE Journal, 37(2), pp. 233-243.
Generative Continual Concept Learning. 33rd Conference on Neural Information Processing Systems (NeurIPS 2019), pp. 1-10, Vancouver, Canada.

\* cited by examiner

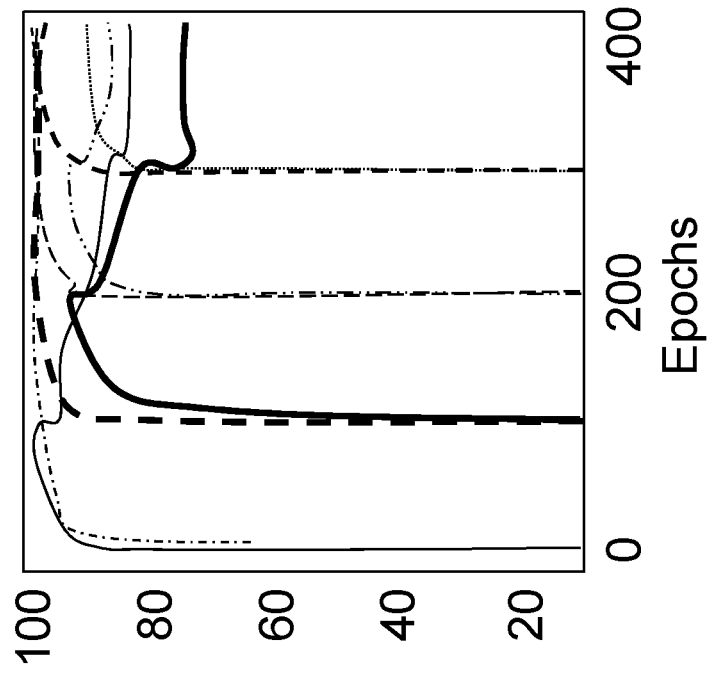
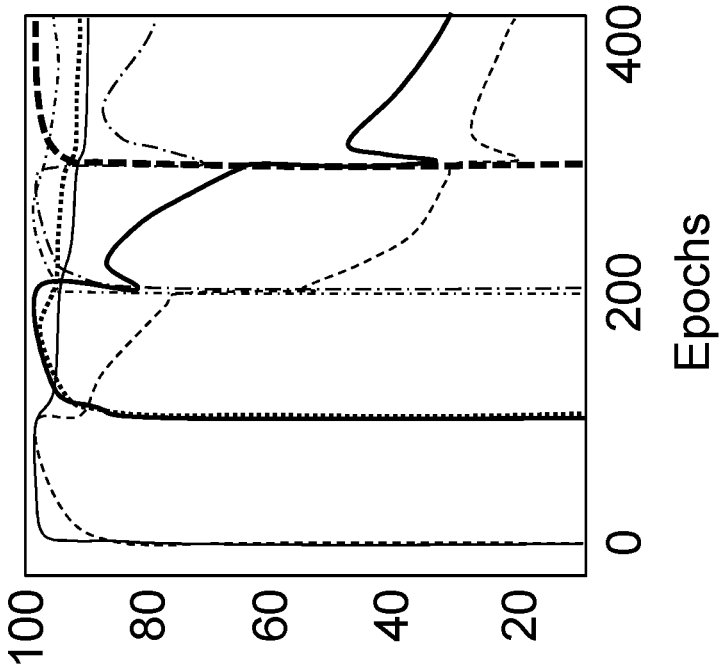
FIG. 4A
FIG. 4B

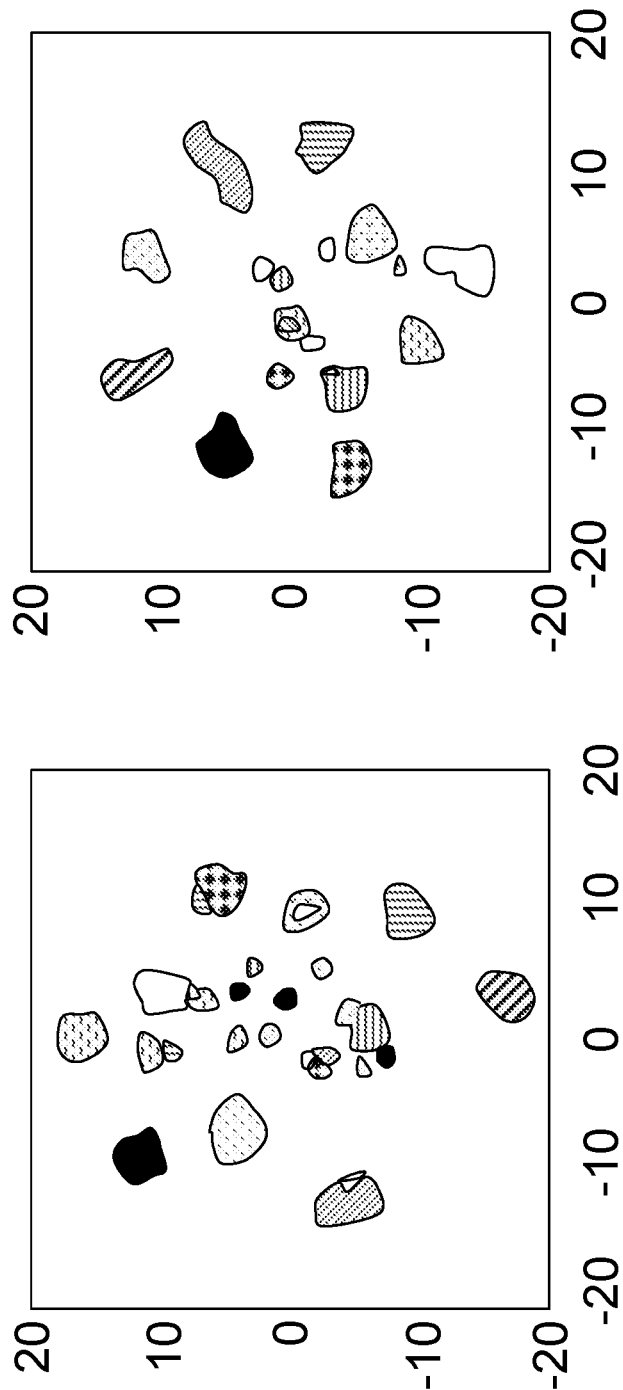

SYSTEMS AND METHODS FOR UNSUPERVISED CONTINUAL LEARNING

CROSS-REFERENCE TO RELATED APPLICATIONS

This is a Non-Provisional Application of U.S. Provisional Patent Application No. 62/953,063, filed Dec. 23, 2019, entitled, "Systems and Methods for Unsupervised Continual Learning", the entirety of which is incorporated herein by reference.

GOVERNMENT LICENSE RIGHTS

This invention was made with government support under U.S. Government Contract Number FA8750-18-C-0103 awarded by AFRL/DARPA. The government has certain rights in the invention.

BACKGROUND OF INVENTION

(1) Field of Invention

The present invention relates to a system for unsupervised continual learning and, more particularly, to a system for unsupervised continual learning using a few labeled data points without forgetting the past.

(2) Description of Related Art

Unlike classic machine learning, lifelong learning is a learning scenario where the lessons to be learned change over time, yet it is imperative that the previously learned lessons not be forgotten. For example, autonomous self-driving cars need to perform well in different weather conditions and types of roads, despite being trained on more limited conditions. Model retraining is not a feasible solution for lifelong learning because collecting labeled data to supervise learning is time-consuming and computationally expensive. As a result, a lifelong learning system should be able to explore and learn the new condition fast using a minimal number of labeled data points without forgetting what has been learned before to avoid computationally expensive model retraining.

Lake et al. (see Literature Reference No. 7 in the List of Incorporated Literature References) modeled human concept learning within a "Bayesian probabilistic learning" (BPL) paradigm. They present BPL as an alternative for deep learning to mimic the learning ability of humans as these models require considerably less amount of training data. The concepts are represented as probabilistic programs that can generate additional instances of a concept given a few samples of that concept. However, the proposed algorithm in Lake et al. (see Literature Reference No. 7) requires human supervision and domain knowledge to tell the algorithm how the real-world concepts are generated. This approach seems feasible for the recognition task that they have designed to test their idea, but it does not scale to other more challenging concept learning problems. As can be appreciated, a scalable and continual learning system is needed.

Thus, a continuing need exists for a system for unsupervised continual learning using a few labeled data points without forgetting the past.

SUMMARY OF INVENTION

The present invention relates to a system for unsupervised continual learning and, more particularly, to a system for unsupervised continual learning using a few labeled data points without forgetting the past. The system comprises one or more processors and one or more associated memories, each associated memory being a non-transitory computer-readable medium having executable instructions encoded thereon such that when executed, the one or more processors perform multiple operations. The system adapts a set of knowledge previously learned by a machine learning model for performance in a new domain. Adapting the set of knowledge includes receiving a consecutive sequence of new domains, where each new domain comprises new task data. The new task data and a plurality of past learned tasks is forced to share a data distribution in an embedding space, resulting in a shared generative data distribution. Using the shared generative data distribution, a set of pseudo-data points is generated for the past learned tasks. Each new domain is learned using both the set of pseudo-data points and the new task data. The machine learning model is updated using both the set of pseudo-data points and the new task data.

In another aspect, knowledge of data distributions obtained from the plurality of past learned tasks is used to match a data distribution of new task data in the embedding space.

In another aspect, the embedding space is invariant with respect to any learned task, such that new task data does not interfere with remembering any past learned task.

In another aspect, a Sliced Wasserstein Distance metric is used to force the new task data and the plurality of past learned tasks to share the data distribution in the embedding space.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A is an illustration of learning curves for four permuted Modified National Institute of Standards and Technology (MNIST) tasks, comparing classic back propagation (BP) and learning using fully labeled data (Continual Learning using Encoded Experience Replay (CLEER)) according to some embodiments of the present disclosure;

FIG. 4B is an illustration of learning curves for four permuted MNIST tasks, comparing the Efficient Concept Learning Algorithm (ECLA) and full experience replay (FR) according to some embodiments of the present disclosure;

FIG. 5C is an illustration of a UMAP visualization for digit recognition from the MNIST domain to the USPS domain according to some embodiments of the present disclosure;

FIG. 5D is an illustration of a UMAP visualization for digit recognition from the USPS domain to the MNIST domain according to some embodiments of the present disclosure.

DETAILED DESCRIPTION

Figure 1:
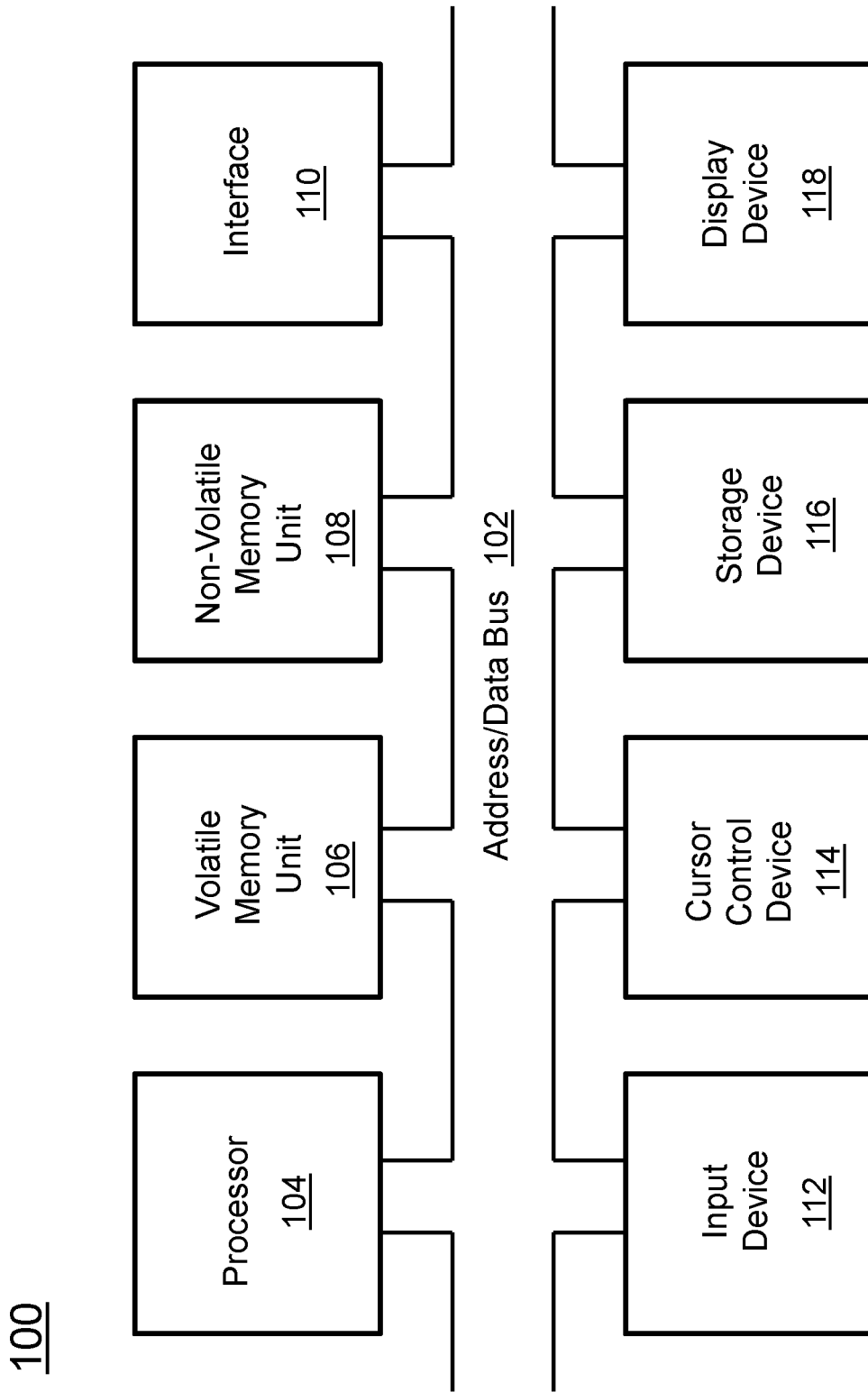
FIG. 1 is a block diagram depicting the components of a system for unsupervised continual learning according to some embodiments of the present disclosure.

The present invention relates to a system for unsupervised continual learning and, more particularly, to a system for unsupervised continual learning using a few labeled data points without forgetting the past. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiments of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Nicolas Bonneel, Julien Rabin, Gabriel Peyr'e, and Hanspeter Pfister. Sliced and Radon Wasserstein Barycenters of Measures. Journal of Mathematical Imaging and Vision, 51(1): 22-45, 2015.
2. Nicolas Bonnotte. Unidimensional and evolution methods for optimal transportation. PhD thesis, Chapter 5.1, Paris 11, 2013.
3. Nicolas Courty, Remi Flamary, Devis Tuia, and Alain Rakotomamonjy. Optimal Transport for Domain Adaptation. IEEE Transactions on Pattern Analysis and Machine Intelligence, 39(9):1853-1865, 2017.
4. Amir Globerson and Sam T Roweis. Metric Learning by Collapsing Classes. In Advances in Neural Information Processing Systems, pages 451-458, 2006.
5. James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al. Overcoming Catastrophic Forgetting in Neural Networks. Proceedings of the National Academy of Sciences, 114(13):3521-3526, 2017.
6. Alex Krizhevsky, Ilya Sutskever, and Geoffrey E Hinton. ImageNet Classification with Deep Convolutional Neural Networks. In Advances in Neural Information Processing Systems, pages 1097-1105, 2012.
7. Brenden M Lake, Ruslan Salakhutdinov, and Joshua B Tenenbaum. Human-Level Concept Learning through Probabilistic Program Induction. Science, 350(6266): 1332-1338, 2015.
8. Yann LeCun, Bernhard E Boser, John S Denker, Donnie Henderson, Richard E Howard, Wayne E Hubbard, and Lawrence D Jackel. Handwritten Digit Recognition with a Back-Propagation Network. In Advances in Neural Information Processing Systems, pages 396-404, 1990.
9. Marieke Longcamp, Marie-Therese Zerbato-Poudou, and Jean-Luc Velay. The Influence of Writing Practice on Letter Recognition in Preschool Children: A Comparison Between Handwriting and Typing. Acta Psychologica, 119(1):67-79, 2005.
10. James L McClelland, Bruce L McNaughton, and Randall C O'Reilly. Why There are Complementary Learning Systems in the Hippocampus and Neocortex: Insights from the Successes and Failures of Connectionist Models of Learning and Memory. Psychological Review, 102(3): 419, 1995.
11. James L McClelland and Timothy T Rogers. The Parallel Distributed Processing Approach to Semantic Cognition. Nature Reviews Neuroscience, 4(4):310, 2003.
12. James L McClelland, David E Rumelhart, PDP Research Group, et al. Parallel Distributed Processing. Explorations in the Microstructure of Cognition, 2:216-271, 1986.

13. Michael McCloskey and Neal J Cohen. Catastrophic Interference in Connectionist Networks: The Sequential Learning Problem. In Psychology of Learning and Motivation, volume 24, pages 109-165. Elsevier, 1989.
14. Leland McInnes, John Healy, and James Melville. UMap: Uniform Manifold Approximation and Projection for Dimension Reduction. arXiv preprint arXiv: 1802.03426, 2018.
15. Saeid Motiian, Quinn Jones, Seyed Iranmanesh, and Gianfranco Doretto. Few-shot adversarial domain adaptation. In Advances in Neural Information Processing Systems, pages 6670-6680, 2017.
16. German I Parisi, Ronald Kemker, Jose L Part, Christopher Kanan, and Stefan Wermter. Continual Lifelong Learning with Neural Networks: A Review. Neural Networks, 2019.
17. Julien Rabin and Gabriel Peyre. Wasserstein Regularization of Imaging Problem. In 2011 18th IEEE International Conference on Image Processing, pages 1541-1544, IEEE, 2011.
18. Anthony Robins. Catastrophic Forgetting, Rehearsal and Pseudorehearsal. Connection Science, 7(2):123-146, 1995.
19. Mohammad Rostami, Soheil Kolouri, and Praveen Pilly. Complementary Learning for Overcoming Catastrophic Forgetting Using Experience Replay. In IJCAI, 2019.
20. Paul Ruvolo and Eric Eaton. Ella: An Efficient Lifelong Learning Algorithm. In International Conference on Machine Learning, pages 507-515, 2013.
21. Andrew M Saxe, James L McClelland, and Surya Ganguli. A Mathematical Theory of Semantic Development in Deep Neural Networks. Proceedings of the National Academy of Sciences, pages 11537-11546, 2019.
22. Shai Shalev-Shwartz and Shai Ben-David. Understanding Machine Learning: From Theory to Algorithms, Chapter 2.2. Cambridge University Press, 2014.
23. Hanul Shin, Jung Kwon Lee, Jaehong Kim, and Jiwon Kim. Continual Learning with Deep Generative Replay. In Advances in Neural Information Processing Systems, pages 2990-2999, 2017.
24. Jake Snell, Kevin Swersky, and Richard Zemel. Prototypical Networks for Few-Shot Learning. In Advances in Neural Information Processing Systems, pages 4077-4087, 2017.
25. Mark A. Kramer. Nonlinear Principal Component Analysis Using Autoassociative Neural Networks. AIChE Journal, 37(2), pages 233-243.

(2) Principal Aspects

Various embodiments of the invention include three "principal" aspects. The first is a system for unsupervised continual learning. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within one or more computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
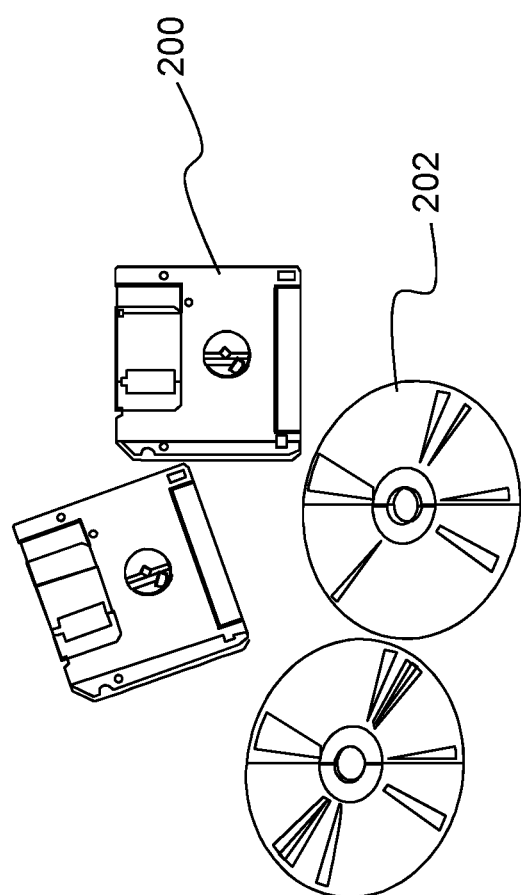
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a system and method that allows machines to adapt their learned knowledge to perform well in a new domain where only a few labeled data points are accessible, in a lifelong learning scenario. In one embodiment, the learned knowledge is a set of lessons previously learned by a machine learning model for performance in the new domain. A lesson here refers to a unique mapping for the data from the input space to the output space. Additionally, the invention according to embodiments of the present disclosure overcomes the problem of catastrophic forgetting in this learning setting. These goals are achieved by using the past learned knowledge to learn new domains optimally and at the same time retain the past learned knowledge by integrating newly learned knowledge (e.g., new lessons) with past knowledge (e.g. past lessons) consistently such that no interference occurs over time. In other words, a machine learning model implicitly is equipped with a memory mechanism to retain the past learned knowledge. To accomplish this learning, a sequential multitask learning setting is considered, where an agent learns sequential tasks such that the distribution of their input data is subject to change. Each task can be considered as learning a new domain (e.g., electro-optical (EO) domain, synthetic aperture radar (SAR) domain, infra-red (IR) domain), but with the same underlying object categories or concepts. In one setting, only the first task has fully labeled data and for the rest of the tasks, only a few labeled data per class is accessible. As a result, the machine needs to adapt to learn the new task using a limited number of labeled data points without forgetting the past learned tasks. In order to adapt the system continually and to prevent forgetting in this continual learning setting, experience replay is relied upon. The core idea of experience replay is to feed representative data points from past tasks to the system when learning new tasks to enforce the system to remember past tasks.

The system and method described herein (1) enables an autonomous learning agent to adapt to different input task distributions using only a few labeled data points; (2) enables the agent to retain the previously learned tasks when a new task is learned; and (3) enables accumulation of what has been learned from the new task to a shared generative distribution, which is used in learning future tasks in order to avoid forgetting the previously learned task. Thus, the invention allows the system to be trained on new tasks using a few labeled data points without forgetting what has been learned before.

Figure 3:
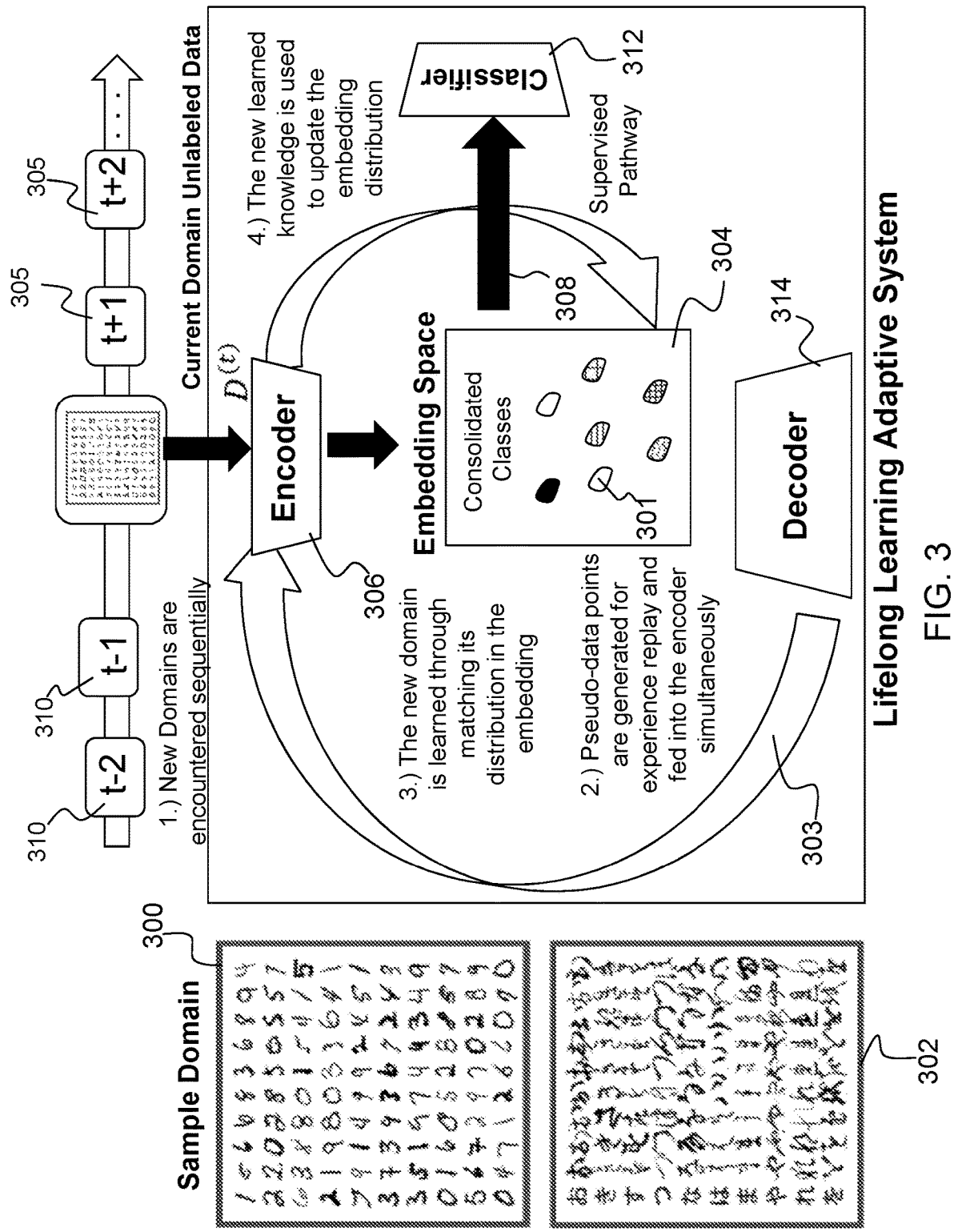
FIG. 3 is an illustration of a system for unsupervised continual learning according to some embodiments of the present disclosure.

FIG. 3 illustrates the system level description of a continual learning system which uses the approach described herein to adapt a system continually to learn new tasks without forgetting the past domains. In a first step, new domains, such as sample domains 300 and 302, are encountered sequentially. In FIG. 3, the illustrated sample domains 300 and 302 represent visual symbols of the same series of digits in different language scripts. When the sequential tasks are learned, the data classes are formed as clusters in the embedding space 304 (i.e., Consolidated Classes) 301. The method described herein consolidates these clusters to enable the network to remember the past tasks and use them to learn new tasks with a few labeled data points. In a second step, pseudo-data points 303, which are synthetically generated samples that follow the distribution of observed data, are generated, by class-conditional statistical sampling from the consolidated classes 301, and are used for experience replay and fed into an encoder network 306 simultaneously.

In the system according to embodiments of the present disclosure, a generative supervised pathway 308 and a generative autoencoder have been added to the machine learning system to avoid the requirement for a memory buffer to store labeled samples from past tasks 310, denoted as t−2 and t−1 in FIG. 3. The generative supervised pathway 308 is used to compute the labels for the pseudo data points that are generated for the previous tasks (t=1 to T−1). In other words, the generative supervised pathway 308 helps to create the pseudo-dataset for previous tasks (see equation (2) below).

As a result, the trained system is able to generate pseudo-data points 303 for the past tasks 310 (i.e., classifying input sensory data). To this end, the current tasks 305 (denoted as t+1 and t+2) and past tasks 310 are coupled by enforcing them to share the same parametric distribution in a task-invariant embedding space 304. This shared distribution can then be used to generate pseudo-data points 303 using the decoder network 314 that can be used for experience replay (in the second step). In a third step, the new domain is learned through matching its distribution in the embedding space 304. In a fourth step, the new learned knowledge is used to update the embedding distribution. The method enables a machine/agent to remember previously learned tasks (i.e., past tasks 310) and easily learn new tasks (i.e., current tasks 305) without corrupting the knowledge of previously learned tasks (i.e., past tasks 310). An "agent" is any type of machine or robot (autonomous platform) that learns the tasks.

In the system according to embodiments of the present disclosure, learning concepts in each domain (e.g., 300 and 302) is considered to be a machine learning (ML) task (e.g., learning different types of digit characters). Consider a continual learning setting (see Literature Reference No. 20), where an agent receives consecutive tasks $\{\mathcal{Z}^{(t)}\}_{t=1}^{T_{Max}}$ in a sequence t=1, . . . , $T_{Max}$ over its lifetime. The total number of tasks, distributions of the tasks, and the order of tasks is not known a priori. Without implying a limitation, each task (e.g., current task 305) denotes a particular domain (e.g., different types of digit characters (e.g., domains 300 and 302)). Since the agent is a lifelong learner, the current task 305 is learned at each time step (e.g., t+1), and the agent then proceeds to learn the next task (e.g., t+2). The knowledge that is gained from experience is used to learn the current task 305 efficiently (i.e., using a minimal number of labeled data). The new learned knowledge from the current task 305 is accumulated to past experience to potentially ease learning in the future. Additionally, this accumulation must be done consistently to generalize the learned concepts as the agent must perform well on all learned tasks (i.e., not to forget). This is because the learned tasks (i.e., past tasks 310) may be encountered at any time in future.

An abstract concept is modeled as a class within a domain-dependent classification task. Data points for each task are drawn independent and identically distributed (i.i.d.) from the joint probability distribution (i.e., $x_i^{(t)}$, $y_i^{(t)}$)~$p^{(t)}(x, y)$, which has the marginal distribution $q^{(t)(x)}$ over x. Consider a deep neural network $f_\theta$: $\mathbb{R}^d \to \mathbb{R}^k$ as the base learning system, where θ denotes the learnable weight parameters. A deep network is able to solve classification tasks through extracting task-dependent high quality features in a data-driven end-to-end learning (see Literature Reference No. 6). Within the (Parallel Distributed Processing) PDP paradigm (see Literature Reference Nos. 11, 12, and 21), this means that the data points are mapped into the discriminative embedding space 304, modeled by the network hidden layers, where the classes become separable, forming consolidated classes b 301. That is, data points belonging to a consolidated class 301 are grouped to represent an abstract concept. On this basis, a deep network $f_\theta$ is a functional composition of the encoder network 306 $\phi_v$ (•): $\mathbb{R}^d \to \mathcal{Z} \subset \mathbb{R}^f$ (which maps the input space with higher dimensionality d into the embedding space with lower dimensionality f) with learnable parameter v, that encodes the input data into the embedding space Z 304 (which provides the task outputs) and a classifier network 312 $h_w$(•): $\mathbb{R}^f \to \mathbb{R}^k$ with learnable parameters w, that maps encoded information into the label space. The encoder network $\phi_v$, 306 is a multilayer deep neural network with parameter v (parameters are the synaptic weights and biases) with a d dimensional vector as its input and an f-dimensional vector as its output. The encoder network 306 extracts f number of features from the d-dimensional input data. The parameters of the encoder network $\phi_v$, 306 are trained as part of equation (1) described below. The encoder network 306 is used to understand an input sequence and create a smaller dimensional representation of it. The representation is then forwarded to a decoder network 314, which generates a sequence of its own that represents the output. The encoder network 306 is a deterministic function that compresses the input data distribution into a lower dimensionality. Because the embedding space 304 is discriminative, the data distribution in the embedding space 304 is a multi-modal distribution that can be modeled as a Gaussian mixture model (GMM). FIGS. 6A, 6B, 7A, and 7B show this intuition based on experimental data used in the experimental validation section, as will be described in detail below.

Within the machine learning formalism, the agent can solve the task $\mathcal{Z}^{(1)}$ of encoding the input data into the embedding space 304 using standard empirical risk minimization (ERM). Given the labeled training dataset $\mathcal{D}^{(1)} = \langle X^{(1)}, Y^{(1)} \rangle$, where $X^{(1)} = [x_1^{(1)}, \ldots, x_{n_t}^{(1)}] \in \mathbb{R}^{d \times n_1}$ and $Y^{(1)} = [y_1^{(1)}, \ldots, y_n^{(1)}] \in \mathbb{R}^{k \times n_t}$, one can solve for the network optimal weight parameters:

$$\hat{\theta}^{(t)} = \arg\min_\theta \hat{e}_\theta = \arg\min_\theta 1/n_t \Sigma_i \mathcal{L}_d(f_\theta(x_i^{(t)}), y_i^{(t)}).$$

Here, $\mathcal{L}_d$ (•) is the loss function (e.g., cross entropy). For experimental validation, loss function was implemented using cross entropy, which is defined as H (p, q)=−$\Sigma_{x \in \chi}$p (x)log (q(x)) for discrete probability distributions p and q with the same support x. Conditioned on having a large enough number of labeled data points $n_1$, the empirical risk would be a suitable function to estimate the real risk function, e=$\mathbb{E}_{(x,y) \sim p^{(t)}(x,y)}(\mathcal{L}_d(f_\theta^{(t)}(x), y))$ (see Literature Reference No. 22) as the Bayes optimal objective. Hence, the trained system will generalize well on test data points for the task $\mathcal{Z}^{(1)}$. Good generalization performance means that each class would be learned as a concept which is encoded in the downstream layers of the deep network. The goal is to consolidate these learned concepts and generalize them so that they can be efficiently used when new tasks with a minimal number of labeled data points is encountered. That is, for tasks $\mathcal{Z}^{(t)}$, t>1, there is access to the dataset $\mathcal{D}^{(t)} = \langle \{X^{(t)}, Y^{(t)}\}, X^{(t)} \rangle$, where $X^{(t)} \in \mathbb{R}^{d \times n_t}$ denotes the labeled data points and $X^{(t)} \in \mathbb{R}^{d \times n_t}$ denotes the unlabeled data points. This learning setting means that the learned concepts must be generalized in subsequent domains with minimal supervision. Standard ERM cannot be used to learn the subsequent tasks because the number of labeled data points is not sufficient (i.e., overfitting would occur). Additionally, even in the presence of enough labeled data, catastrophic forgetting would be consequence of using ERM. This is because the system parameters will be updated using solely the current task data which can potentially shift the model parameter values from the optimal values for the previously learned tasks in the past time step. Hence, the agent would not retain its learned knowledge when drifts in data distributions occur.

The goal is to use the encoded distribution in the embedding space 304 to expand the concepts that are captured in the embedding space 304 such that catastrophic forgetting does not occur. The gist of the idea is to update the encoder network 306 such that each subsequent task is learned so that its distribution in the embedding space 304 matches the distribution that is shared by $\{\mathcal{Z}^{(t)}\}_{t=1}^{T-1}$ at t=T. Since this distribution is initially learned via $\mathcal{Z}^{(t)}$ and subsequent tasks (with the same underlying object categories or concepts) are enforced to share this distribution in the embedding space 304 with $\mathcal{Z}^{(t)}$, it does not need to learn it from scratch, as the concepts are shared across the tasks (e.g., symbols of digits in different language scripts that allude to the same concepts of numerosity). As a result, since the embedding space 304 becomes invariant with respect to any learned input task, catastrophic forgetting will not occur because the new learned knowledge does not interfere with what has been learned before.

A key challenge is to adapt the standard ERM such that the tasks share the same distribution in the embedding space 304 to force semantic congruency across the different underlying concepts across tasks. To this end, the base network $f_\theta(\cdot)$ is modified to form a generative autoencoder by amending the system with the decoder network 314 $\psi_u: \mathcal{Z} \to \mathcal{X}$ with learnable parameters u. The system is trained such that the pair $(\phi_v, \psi_u)$ form an autoencoder, which can learn low-compressed representations of the data that can be decoded back into the input space as needed. An autoencoder is a type of artificial neural network used to learn efficient data codings in an unsupervised manner (see Literature Reference No. 25). An autoencoder learns a representation (encoding) for a set of data, typically for dimensionality reduction, by training the network to ignore signal noise. Doing so, the ability of the system to encode the concepts as separable clusters in the embedding is enhanced. The knowledge about the data distributions that is obtained from the past tasks is used to match the distribution of the current task data. This leads to consistent generalization of the learned concepts. Additionally, since the system is generative and knowledge about past experiences is encoded in the network, the (Complementary Learning Systems) CLS process (see Literature Reference No. 10) can be used to prevent catastrophic forgetting. When learning a new task, pseudo-embedded-data points for the past learned tasks can be generated by sampling from the shared distribution in the embedding space (element 304), while feeding the samples to the decoder (element 314) sub-network, thereby generating pseudo-data samples in the input space. In other words, the sampling is performed in the embedding space (element 304) to generate pseudo-embedded-data. The decoder (element 314) is then used to reconstruct a pseudo-input-data from a previous task in the input space (e.g., image) from the pseudo-embedded-data. These pseudo-data points are used along with new task data to learn each task. Since the new task is learned such that its distribution matches the past shared distribution, pseudo-data points generated for learning future tasks would also represent the current task as well.

(3.1) Efficient Concept Learning Algorithm(ECLA) Algorithm

Following the above system, learning the first task (t=1) reduces to minimizing the discrimination loss for classification and the autoencoder reconstruction loss to solve for the optimal parameters:

$$\min_{v,w,u} \mathcal{L}_c(X^{(1)}, Y^{(1)}) = \min{}_{v,w,u} 1n1 i=1n1$$
$$\mathcal{L}_d hw\phi v xi1,yi1 + \gamma \mathcal{L}_r(\psi u \phi v xi1, xi1), \quad (1)$$

where $\mathcal{L}_r$ is the reconstruction loss, $\mathcal{L}_c$ is the combined loss, $\mathcal{L}_d$ is the discrimination loss for classification, and $\gamma$ is a trade-off parameter between the two loss terms.

If the base learning system is complex enough, the concepts would be formed in the embedding space as separable clusters upon learning the first task. This means that the data distribution can be modeled as a GMM distribution in the embedding. Standard methods can be used, such as expectation maximization, to fit a GMM distribution with k components to the multimodal empirical distribution formed by the drawn samples $\{(\phi_v(x_i^{(1)}), y_i^{(1)})_{i=1}^{n_1}\}_{i=1}^{n_1} \sim \hat{p}_J^{(0)}$ in the embedding space 304. Multimodal empirical distribution is a data distribution with a mixture of multiple modes, as opposed to a distribution with a single mode, such as a normal/Gaussian distribution. Let $\hat{p}_{J,k}^{(0)}(z)$ denote the estimated parametric GMM distribution. The goal is to retain this initial estimation that captures concepts when future domains are encountered. The subsequent tasks are learned such that the current task 305 shares the same GMM distribution with the previous learned tasks in the embedding space 304. The estimate of the shared distribution is updated after learning each subsequent task. Updating this distribution means generalizing the concepts to the new domains without forgetting the past domains. As a result, the distribution $\hat{p}_{J,k}^{(t-1)}(Z)$ captures knowledge about past domains when $\mathcal{Z}^{(t)}$ is being learned. Moreover, experience replay can be performed by generating pseudo-data points 303 by first drawing samples from $\hat{p}_{J,k}^{(t-1)}(Z)$ and then passing the samples through the decoder network 314. The remaining challenge is to update the system such that each subsequent task is learned such that its corresponding empirical distribution matches $\hat{p}_{J,k}^{(t-1)}(z)$ in the embedding space 304. Doing so ensures suitability of GMM to model the empirical distribution.

To match the distributions, consider $\mathcal{Z}_{ER}^{(T)} = \langle \psi(Z_{ER}^{(T)}, Y_{ER}^{(T)}) \rangle$ denote the pseudo-dataset 303 for tasks $\{\mathcal{Z}^{(t)}\}_{t=1}^{T-1}$, generated for experience replay when $\mathcal{Z}^{(t)}$ is being learned. Following the described system, the following optimization problem is formed to learn $\mathcal{Z}^{(t)}$ and generalized concepts:

$$\min_{v,w,u} \mathcal{L}_{SL}(X^{(t)}, Y^{(t)}) + \mathcal{L}_{SL}(X_{ER}^T, Y_{ER}^T) + \eta D(\phi_v(q^{(t)}(X^{(t)})), \hat{p}_{J,k}^{(t)}(Z_{ER}^{(T)})) \quad (2)$$

$$\lambda \sum_{j=1}^{k} D(\phi_v(q^{(t)}(X^{(t)}) | C_j), \hat{p}_{J,k}^{(t)}(Z_{ER}^{(T)} | C_j)), \forall t \geq 2$$

where $D(\cdot, \cdot)$ is a suitable metric function to measure the discrepancy between two probability distributions. $\lambda$ and $\eta$ are a trade-off parameters. The first two terms in Eq. (2) denote the combined loss terms for each of the current tasks' 305 few labeled data points and the generated pseudo-dataset 303, defined similar to Eq. (1). The third and the fourth terms implement the idea and enforce the distribution for the current task 305 to be close to the distribution shared by the past learned task 310. The third term is added to minimize the distance between the distribution of the current tasks 305 and $\hat{p}_{J,k}^{(t-1)}(z)$ in the embedding space 304. Data labels are not needed to compute this term. The fourth term may look similar but note that the distance between the two distribution on the concepts has been conditioned to avoid the matching challenge (i.e., when wrong concepts (or classes) across two tasks are matched in the embedding space (see Literature Reference No. 4). The few labeled data that are accessible for the current task 305 are used to compute this term. Adding these terms guarantees that GMM is continuously used to model the shared distribution in the embedding.

Algorithm 1 ECLA ($\mathcal{L}$, $\lambda$, $\eta$, N epochs)
1. Input: data $\mathcal{D}^{(t)}=(X^{(1)}, Y^{(t)})$.
2. $\mathcal{D}^{(t)}=(\{X^{(t)}, Y^{(t)}\}, X^{(t)})_{t=2}^{T_{Max}}$
3. Concept learning: learning the first task (t=1) by solving (1) using N epochs of stochastic gradient descend
4. Fitting GMM:
5. estimate $\hat{p}_{J,k}^{(0)}(\bullet)$ using $\{\phi_v(x_i^{(1)}))\}_{i=1}^{n_t}$
6. for t>2 do
7. Generate the pseudo dataset 303:
8. $\mathcal{D}_{ER}=\{(x_{er,i}^{(t)}=\psi(z_{er,i}^{(t)})\}$
9. $(z_{er,i}^{(t)}, y_{er,i}^{(t)})\sim\hat{p}_{J,k}^{(t-1)}(\bullet)$
10. Update:
11. Learnable parameters are updated by
12. Solving Eq. (2) using N epochs of stochastic gradient descend
13. Concept Generalization:
14. update $\hat{p}_{J,k}^{(t-1)}(\bullet)$ using the combined samples
15. $\{\phi_v(x_i^{(t)})), \phi_v(x_{er,i}^{(t)}))\}_{i=1}^{n_t}$ The main remaining question is selection of a suitable probability distance metric D(•,•). Common probability distance measures, such as Jensen Shannon divergence or Kullback-Leibler (KL) divergence, are not applicable for the problem described herein, as the gradient for these measures is zero when the corresponding distributions have non-overlapping supports (see Literature Reference No. 17). Since deep learning optimization problems are solved using first-order gradient-based optimization methods, a distribution metric must be selected which has non-vanishing gradients. For this reason, the Wasserstein Distance (WD) metric (see Literature Reference No. 2) was selected, which satisfies this requirement and has recently been used extensively in deep learning applications to measure the distance between two probability distributions (see Literature Reference No. 3). In particular, Sliced Wasserstein Distance (SWD) (see Literature Reference No. 1) is used, which is a suitable approximation for WD because the Sliced Wasserstein Distance can be computed efficiently using empirical samples drawn from two distributions. The concept learning algorithm according to embodiments of the present disclosure, Efficient Concept Learning Algorithm (ECLA), is summarized in Algorithm 1 above.

(3.2) Experimental Studies

The method described herein was validated on learning two sets of sequential learning tasks: permuted Modified National Institute of Standards and Technology (MNIST) tasks and digit recognition tasks. These are standard benchmark classification tasks for sequential task learning, which were adjusted for the learning setting of the invention. Each class in these tasks is considered to be a concept, and each task of the sequence is considered to be learning the concepts in a new domain. Note that all the datasets in the experiments are 10 class (0-9) classification datasets. MNIST and U.S. Postal Service (USPS) are collections of hand written digits with 60,000 and 20,000 training data points, respectively. USPS dataset images have been scaled to 28×28 pixels. To generate permuted MNIST tasks, the literature was followed, and a fixed random permutation was applied to all the MNIST data points for generating each sequential task. Cross entropy loss was utilized as the discrimination loss, and the Euclidean norm was utilized as the Reconstruction loss. The code was implemented using the Keras deep learning application programming interface and run on a cluster node equipped with two Nvidia Tesla P100-SXM2 graphic processing units (GPUs).

(3.2.1) Evaluation Methodology

All these datasets have their own standard testing splits. For each experiment, these testing splits were used to measure performance of the methods that are reported in terms of classification accuracy. Classification rate was used on the testing set to measure performance of the algorithms. At each stochastic gradient descent (SGD) training iteration, the performance on the testing split of each task was computed to generate the learning curves. Ten learning trials were performed on the training sets, and the average performance on the testing sets was reported for these trials. Brute force search was used to cross-validate the parameters for each sequential task.

(3.2.2) Network Structure

For permuted MNIST experiments, an multilayer perceptron (MLP) network was used. A MLP network is a class of feedforward artificial neural network. This selection is natural as the concepts are related through permutations which can be learned with an MLP structure better. For this reason, the images were normalized and converted to 784×1 vectors. The network had three hidden layers with 512, 256, and 16 nodes, respectively. Rectified linear unit (ReLU) activation was used between the hidden layers, and the third hidden layer was selected as the embedding space. This selection is natural because the last hidden layer supposedly should respond to more abstract concepts. The decoder network 314 is generated by mirroring the encoder network 306 and the classifier network 312 is one layer with ten nodes and sigmoid activation.

For sequential digit recognition experiments, convolutional structure was used, as the concepts are spatially related in the domains for these tasks (i.e., digit "1"'s are spatially similar to each other across the domains, and convolutional neural networks (CNNs) are able to capture similarity of the concepts across the tasks. Four convolutional layers were used with rectified linear unit (ReLU) nonlinearity. Experiments used 128, 64, 32, and 16 filters with 2×2 size, respectively. Similarly, the decoder network 314 is generated by mirroring this structure. The last convolutional layer response is flattened, and a dense layer is used to form the embedding space 304 with dimension 64. The classifier network 312 is a single layer with sigmoid.

(3.2.3) Gaussian Mixture Model (GMM) Fitting

Figure 4D:
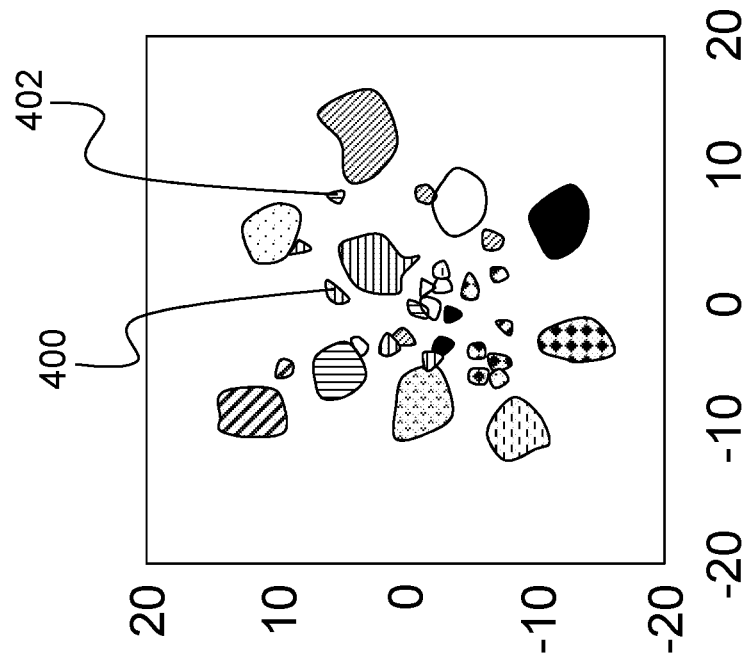
FIG. 4D is an illustration of a UMAP visualization of ECLA according to some embodiments of the present disclosure.

Standard expected maximization was used to fit a GMM distribution to the data. To improve the GMM estimation, only a subset of data was used for this purpose. As shown in FIG. 4D, there are some data points (e.g., 400 and 402) that do not lie in the corresponding clusters. To clean the data, only those data points that the network is certain about were used as the corresponding labels. To this end, the network prediction was looked at just prior to the sigmoid activation, which is a distribution over the predicted label for a given data points. A threshold was set, and those points for which the network is more certain than the threshold about was chosen as the data point label. Doing so, the Expectation Maximization (EM) algorithm becomes more stable towards outliers and models the instances that are more similar.

(3.2.4) Learning Permuted MNIST Tasks

Permuted MNIST tasks is a standard benchmark that is designed for testing abilities of artificial intelligence (AI) algorithms to overcome catastrophic forgetting (see Literature Reference Nos. 5 and 23). The sequential tasks are generated using the MNIST ($\mathcal{M}$) digit recognition dataset (see Literature Reference No. 8). Each task in the sequence is generated by applying a fixed random shuffling to the pixel values of digit images across the MNIST dataset (see Literature Reference No. 5). As a result, generated tasks are homogeneous in terms of difficulty and are suitable to perform controlled experiments. The learning setting is different compared to prior work as the case is considered where only the data for the initial MNIST task is fully labeled. In the subsequent tasks, only few data points are labeled. No previous method addresses this learning scenario for direct comparison, so the method according to embodiments of the present disclosure was only compared against: a) classic back propagation (BP) single task learning, (b) full experience replay (FR) using full stored data for all the previous tasks, and (c) learning using fully labeled data (CLEER) (see Literature Reference No. 19). The same base network structure was used for all the methods for fair comparison. BP was used to demonstrate that the method described herein can address catastrophic forgetting. FR is used as a lower-bound to demonstrate that the method of the invention is able to learn cross-task concepts without using fully labeled data. CLEER is an instance of ECLA where fully labeled data is used to learn the subsequent tasks. CLEER was used to compare the method described herein against an upper-bound.

Figure 4C:
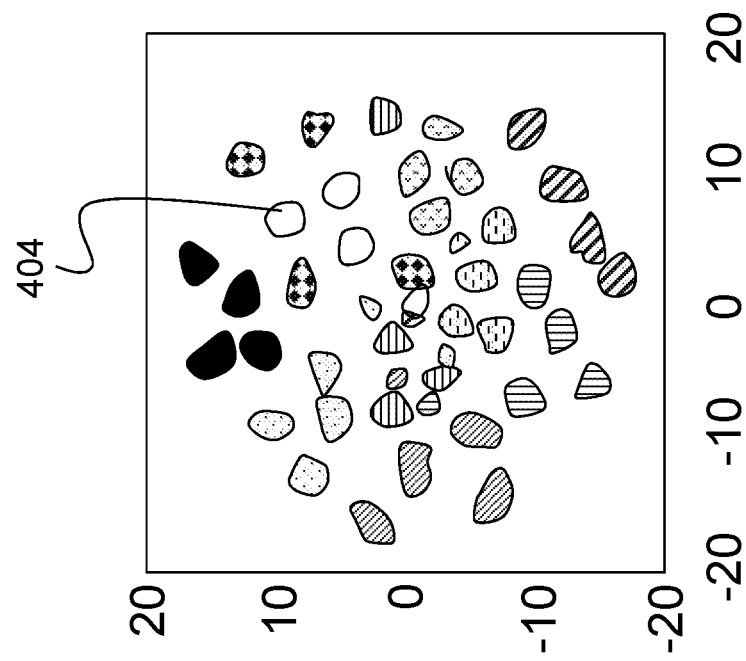
FIG. 4C is an illustration of a Uniform Manifold Approximation and Projection (UMAP) visualization of FR according to some embodiments of the present disclosure.

Standard stochastic gradient descent was used to learn the tasks, and learning curves were created by computing the performance of the system on the standard testing split of the current and the past learned tasks at each learning iteration. Learning curves for four permuted MNIST tasks (FIGS. 4A and 4B) and UMAP visualization of ECLA and FR in the embedding (FIGS. 4C and 4D). FIG. 4A presents learning curves for BP (dashed curves) and CLEER (solid curves). As shown, CLEER (i.e., ECLA with fully labeled data) is able to address catastrophic forgetting. FIG. 4B illustrates learning curves for FR (dashed curves) and ECLA (solid curve) when five labeled data points per class are used, respectively. It was observed that FR can tackle catastrophic forgetting perfectly but the challenge is the memory buffer requirement, which grows linearly with the number of learned tasks, making this method only suitable for comparison as an upper-bound. The FR result also demonstrates that if high-quality pseudo-data points can be generated, catastrophic forgetting can be prevented completely. Deviation of the pseudo-data from the real data is the major reason for the initial performance degradation of ECLA on all the past learned tasks, when a new task arrives and its learning starts. This degradation can be ascribed to the existing distance between $\hat{p}_{J,k}^{(T-1)}$ and $\phi(q^{(s)})$ at $t=T$ for $s<T$. Note the performance on a past learned task degrades more as more tasks are learned subsequently over time. This is compatible with the nervous system as memories fade out as time passes unless enhanced by continually experiencing a task or a concept. In addition to requiring fully labeled data, it was demonstrated that FR does not identify concepts across the tasks. To this end, the testing data was visualized for all the tasks in the embedding space Z for FR and ECLA after learning the fourth task. For visualization purpose, UMAP (see Literature Reference No. 14) was used, which reduces the dimensionality of the embedding space to two. In FIG. 4C and FIG. 4D, each fill pattern denotes the data points of one of the digits $\{0, 1, \ldots, 9\}$ (each circular shape (e.g., element 404) indeed is a cluster of data points). One can see that the digits form separable clusters for both methods. This is the reason behind good performance of both methods. It also demonstrates why GMM is a suitable selection to model the data distribution in the embedding space. However, one can see that when FR is used (FIG. 4C), four distinct clusters (represented by different fill patterns) for each digit are formed (i.e., one cluster per domain for each digit class). In other words, FR is unable to identify and generalize abstract concepts across the domains. In contrast, there are exactly ten clusters for the ten digits when ECLA is used, and hence the concepts are identified across the domains. Note that the smaller circles (e.g., elements 400 and 402) are singleton points and are not smaller clusters. These are data points that the network has found difficult to be classified and are likely instances that are similar to two or more digits. This is the reason that one can generalize the learned concepts to new domains, despite using few labeled data.

(3.2.5) Learning Sequential Digit Recognition Tasks

A second set of experiments was performed on a more realistic scenario. Two handwritten digit recognition datasets were considered for this purpose: MNIST ($\mathcal{M}$) and USPS ($\mathcal{U}$) datasets. USPS dataset is a more challenging classification task as the size of the training set is smaller (20,000 compared to 60,000 images). Experiments were performed on the two possible sequential learning scenarios $\mathcal{U} \rightarrow \mathcal{M}$ and $\mathcal{M} \rightarrow \mathcal{U}$. The experiments can be considered as concept learning for numeral digits as both tasks are digit recognition tasks but in different domains (i.e., written by different people).

Figures 5A, 5B:
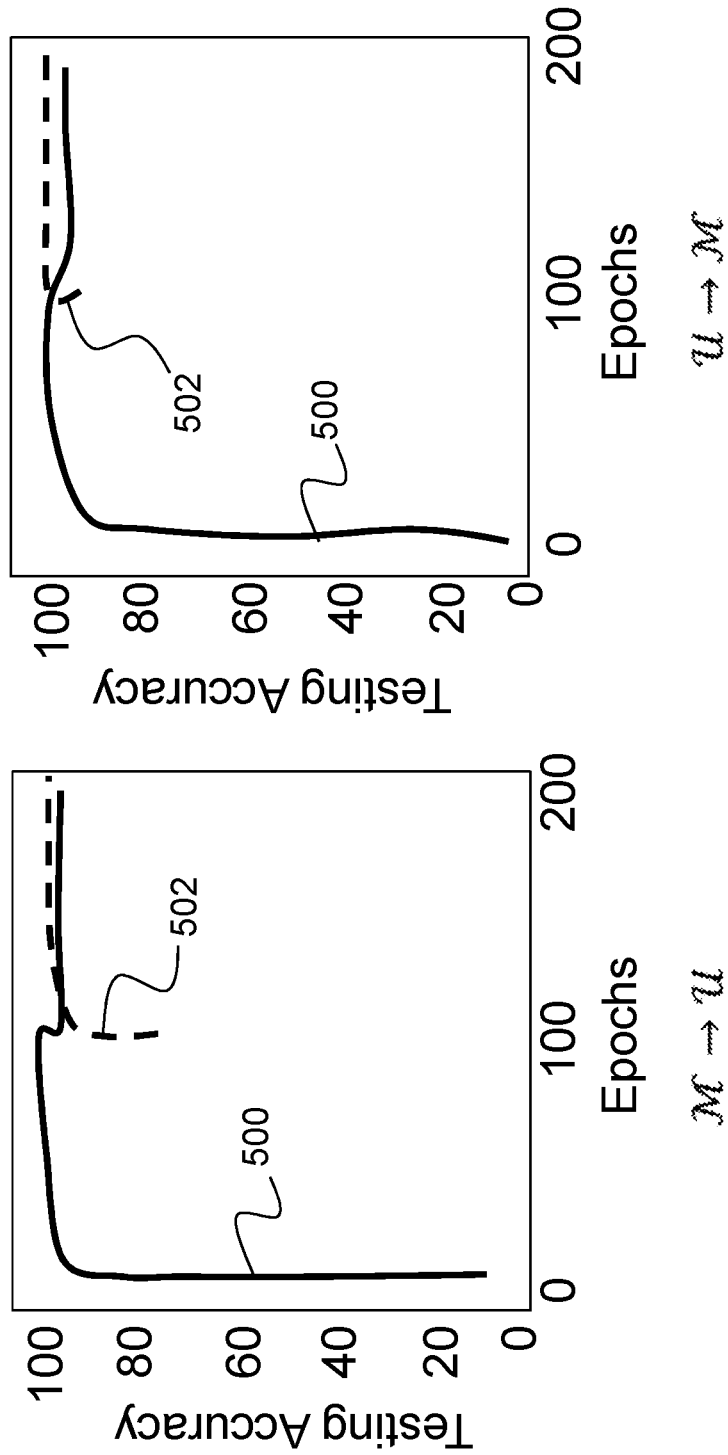
FIG. 5A is an illustration of performance results on a sequential learning scenario of digit recognition from the MNIST domain to the U.S. Postal Service (USPS) domain according to some embodiments of the present disclosure.
FIG. 5B is an illustration of performance results on a sequential learning scenario of digit recognition from the USPS domain to the MNIST domain according to some embodiments of the present disclosure.

FIGS. 5A and 5B depict performance results (i.e., accuracy curves) on MNIST and USPS digit recognition tasks, and FIGS. 5C and 5D illustrate UMAP visualization for $\mathcal{M} \rightarrow \mathcal{U}$ and $\mathcal{U} \rightarrow \mathcal{M}$, respectively. Specifically, FIGS. 5A and 5B present learning curves for two tasks when ten labeled data points per class are used for the training of the second task. The first task is represented by a solid line (element 500), and the second task is represented by a dashed line (element 502). First, note that the network mostly retains the knowledge about the first task (element 500) following the learning of the second task (element 502). Also note that the generalization to the second domain (the second task (element 502) learning) is faster in FIG. 5A, as indicated by the accuracy curve for the second task (element 502) starting from a higher value (i.e., transfer is happening) and achieves top accuracy in a single epoch. Because MNIST dataset has more training data points, the empirical distribution $\hat{p}_{J,k}^{(1)}$ can capture the task distribution more accurately and, hence, the concepts would be learned better which, in turn, makes learning the second task easier. As expected from the theoretical justification, this empirical result suggests that the performance of the algorithm depends on the closeness of the distribution $\psi(\hat{p}_{J,k}^{(1)})$ to the distributions of previous tasks, and that improving the probability estimation will boost the performance of our approach.

In addition, UMAP visualization of the data points for the tasks in the embedding space are depicted in FIGS. 5C and 5D. It was observed that the distributions are matched in the embedding space because, again, ten clusters are formed, despite training the network on two tasks, each with ten classes. This means that cross-domain concepts are learned by the network as the network is able to identify similar classes across the tasks by generalizing the learned concepts. These results demonstrate that the algorithm described herein, inspired by PDP and CLS theories, can generalize concepts to new domains using few labeled data points.

In summary, the system described herein relies on a generative model that can produce pseudo-samples of the learned concepts, but, in contrast to the prior art, an end-to-end deep learning scheme that automatically encodes concepts in the hidden layer of the network with minimal human supervision requirement is followed. Thus, the approach can be applied to a broader range of problems. While data is relied on to train the system, only a few data points are labeled. This is similar to humans with respect to how they too need practice to generate samples of a concept when they do not have domain knowledge (see Literature Reference No. 9). Note that only few data points are labeled and the system according to embodiments of the present disclosure can categorize the training data automatically. This generative strategy has been used in the Machine Learning (ML) literature to address "few-shot learning" (FSL) (see Literature Reference Nos. 15 and 24). The goal of FSL is to adapt a model that is trained on a source domain with sufficient labeled data to generalize well on a related target domain with a few target labeled data points. In the present invention, the domains are different but also are related in that similar concepts are shared across the domains. Most FSL algorithms consider only one source and one target domain, which are learned jointly. Moreover, the main goal is to learn the target task.

In contrast, in the invention described herein a continual learning setting in which the domain-specific tasks arrive sequentially is considered. Hence, catastrophic forgetting becomes a major challenge. An effective approach to tackle catastrophic forgetting is to use experience replay (see Literature Reference Nos. 13, 18, and 19). Experience replay addresses catastrophic forgetting via storing and replaying data points of past learned tasks continually. Consequently, the system retains the probability distributions of the past learned tasks. To avoid requiring a memory buffer to store past task samples, generative models have been used to produce pseudo-data points for past tasks. To this end, generative adversarial learning can be used to match the cumulative distribution of the past tasks with the current task distribution to allow for generating pseudo-data points for experience replay (see Literature Reference No. 23). Similarly, an autoencoder structure can also be used to generate pseudo-data points (see Literature Reference Nos. 16 and 19).

While the system described herein shares some qualities with prior work on lifelong learning, the present invention provides the first solution for the learning setting in which the labeled data is scarce. The system according to embodiments of the present disclosure combines ideas of few-shot learning with generative experience replay to develop a system that can continually generalize its learned knowledge when new unexplored domains are encountered in a lifelong learning setting. To this end, the distributions of the tasks are coupled in the middle layer of an autoencoder, and the shared distribution is used to expand concepts using a few labeled data points without forgetting the past.

Continual learning is an essential requirement for systems that are used over extended time periods. The ability of learning continually and adapting a base model to learn new tasks fast without forgetting past tasks is essential in various applications, including, autonomous systems, and Intelligence, Surveillance and Reconnaissance (ISR). A necessary requirement for these systems is to maintain high performance on previously learned tasks while adapting the system to unexplored situations using knowledge transfer and learning new tasks efficiently using a minimal number of labeled data points.

A system capable of satisfying these requirements can be used in continual and online learning scenarios. This invention can be used to improve a broad range of machines that use machine learning in a continual learning setting. For instance, the system described herein is useful in image recognition systems that are used over extended periods of time. Since data distribution can change over time, these systems need to continually be updated to incorporate changes in the data. Additionally, the invention can be used to enable these systems to retain what has been learned before and adapt to the new domain using a minimal amount of labeled data.

Further, the system described herein is useful in recognition systems that are used in different domains. For example, autonomous devices, such as self-driving vehicles, may be trained to work in a specific environment and then used in a different environment. This invention can be used to enable these vehicles to accumulate new learned knowledge without forgetting previously learned knowledge. In addition, robots are typically trained for a broad range of users, but upon being used in a specific environment, they need to learn to address personalized requirements for each user. This invention can help such products to continually learn and update their performance. Systems that continually encounter unexplored environments, such as rescue robots, are another example of a system that should perform well in unexplored environments, should learn how to quickly act based on prior knowledge and should also add the new learned knowledge to their knowledge repository to enable the rescue robot to move through and explore a new environment. This invention can be used to improve performance of existing systems that use machine learning by enabling the system to update their learned knowledge when unexplored domains are encountered in practice. For example, the system described herein can be applied to a robotic arm that is required to constantly learn new tasks (e.g., assembling new objects) in a factory setting via imitation learning from an expert human. In this example, the robotic arm would be expected to maintain its performance and accuracy on the previously learned tasks (e.g., assembly of previous object types). Additionally, for a perception system in a factory setting, tasks could be learning to identify new classes of objects as part of the previously learned categories. Consider a recycling center where the objects on a conveyor belt are required to be classified as recyclable or non-recyclable via a perception system. The perception module is trained to categorize objects in a set A as recyclable (e.g., cans, plastic containers) (i.e., a previous task). If one would like to add a new object to set A (i.e., a new task) and require the perception module to classify it as recyclable, this can be seamlessly done using the system described herein.

Figure 6:
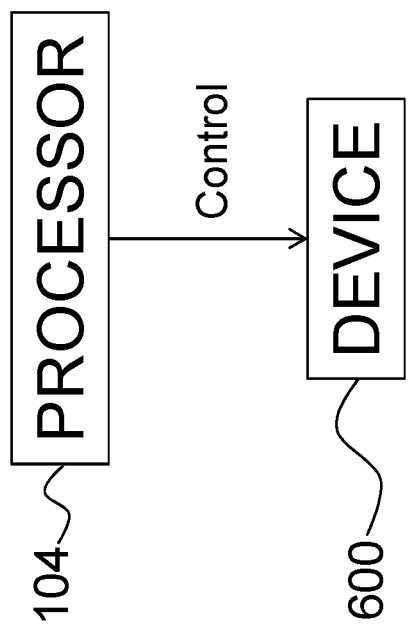
FIG. 6 is an illustration of control of a device according to some embodiments of the present disclosure.

FIG. 6 is a flow diagram illustrating using a processor 104 to control a mechanical component of a device 600 based on the adapted machine learning model. Non-limiting examples of devices 600 that can be controlled via the processor 104 include a motor vehicle. Non-limiting examples of a motor vehicle component (electrical, non-electrical, mechanical) include a brake, a steering mechanism (e.g., steering wheel, piston gear, pinion, linear gear, transverse axis of vehicle), suspension (e.g., wheels, tires, springs, shock absorbers), or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object/scene detection and recognition in a new domain based upon the adapted machine learning model, the system can cause a mechanical component of the autonomous vehicle (or robot) to perform a driving operation/maneuver (such as steering or another command) in line with driving parameters in accordance with the recognized object. For example, if the system recognizes a bicyclist or another vehicle, the system described herein can cause a vehicle maneuver/operation to be performed to avoid a collision with the bicyclist or vehicle (or any other object that should be avoided while driving). The system can cause a mechanical component of the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for continual adaptation of a machine learning model implemented in an autonomous platform, the system comprising:
    one or more processors and one or more associated memories, each associated memory being a non-transitory computer-readable medium having executable instructions encoded thereon such that when executed, the one or more processors perform an operation of:
        adapting a set of knowledge previously learned by a machine learning model for performance in a new domain, wherein adapting the set of knowledge comprises:
            receiving a consecutive sequence of new domains, where each new domain comprises new task data;
            forcing, through dimensionality reduction, the new task data and a plurality of past learned tasks to share a same parametric data distribution in a task invariant embedding space as clusters of consolidated classes, resulting in a shared generative data distribution;
            using the shared generative data distribution, generating a set of pseudo-data points for the past learned tasks;
            learning each new domain using both the set of pseudo-data points and the new task data such that each new domain learned has an empirical data distribution in the task invariant embedding space that matches the same parametric data distribution;
            updating the machine learning model using both the set of pseudo-data points and the new task data; and
        causing one or more mechanical components of the autonomous platform to actuate and, in doing so, causing the autonomous platform to perform a physical driving operation based on the new task data.

2. The system as set forth in claim 1, wherein the one or more processors further perform an operation of using knowledge of data distributions obtained from the plurality of past learned tasks to match a data distribution of new task data in the embedding space.

3. The system as set forth in claim 1, wherein the embedding space is invariant with respect to any learned task, such that new task data does not interfere with remembering any past learned task.

4. The system as set forth in claim 1, wherein the one or more processors further perform an operation of using a Sliced Wasserstein Distance metric to force the new task data and the plurality of past learned tasks to share the data distribution in the embedding space.

5. The system as set forth in claim 1, wherein the shared generative data distribution is a multi-modal distribution modeled as a Gaussian mixture model.

6. A computer implemented method for continual adaptation of a machine learning model implemented in an autonomous platform, the method comprising an act of:
    causing one or more processors to execute instructions encoded on one or more associated memories, each associated memory being a non-transitory computer-readable medium, such that upon execution, the one or more processors perform operations of:
    adapting a set of knowledge previously learned by a machine learning model for performance in a new domain, wherein adapting the set of knowledge comprises:
        receiving a consecutive sequence of new domains, where each new domain comprises new task data;
        forcing, through dimensionality reduction, the new task data and a plurality of past learned tasks to share a same parametric data distribution in a task invariant embedding space as clusters of consolidated classes, resulting in a shared generative data distribution;
        using the shared generative data distribution, generating a set of pseudo-data points for the past learned tasks;
        learning each new domain using both the set of pseudo-data points and the new task data such that each new domain learned has an empirical data distribution in the task invariant embedding space that matches the same parametric data distribution;
        updating the machine learning model using both the set of pseudo-data points and the new task data; and
    causing one or more mechanical components of the autonomous platform to actuate and, in doing so, causing the autonomous platform to perform a physical driving operation based on the new task data.

7. The method as set forth in claim 6, wherein the one or more processors further perform an operation of using knowledge of data distributions obtained from the plurality of past learned tasks to match a data distribution of new task data in the embedding space.

8. The method as set forth in claim 6, wherein the embedding space is invariant with respect to any learned task, such that new task data does not interfere with remembering any past learned task.

9. The method as set forth in claim 6, wherein the one or more processors further perform an operation of using a Sliced Wasserstein Distance metric to force the new task data and the plurality of past learned tasks to share the data distribution in the embedding space.

10. The method as set forth in claim 6, wherein the shared generative data distribution is a multi-modal distribution modeled as a Gaussian mixture model.

11. A computer program product for continual adaptation of a machine learning model implemented in an autonomous platform, the computer program product comprising:
   computer-readable instructions stored on a non-transitory computer-readable medium that are executable by a computer having one or more processors for causing the processor to perform operations of:
   adapting a set of knowledge previously learned by a machine learning model for performance in a new domain, wherein adapting the set of knowledge comprises:
      receiving a consecutive sequence of new domains, where each new domain comprises new task data;
      forcing, through dimensionality reduction, the new task data and a plurality of past learned tasks to share a same parametric data distribution in a task invariant embedding space as clusters of consolidated classes, resulting in a shared generative data distribution;
      using the shared generative data distribution, generating a set of pseudo-data points for the past learned tasks;
      learning each new domain using both the set of pseudo-data points and the new task data such that each new domain learned has an empirical data distribution in the task invariant embedding space that matches the same parametric data distribution;
      updating the machine learning model using both the set of pseudo-data points and the new task data; and
   causing one or more mechanical components of the autonomous platform to actuate and, in doing so, causing the autonomous platform to perform a physical driving operation based on the new task data.

12. The computer program product as set forth in claim 11, wherein the one or more processors further perform an operation of using knowledge of data distributions obtained from the plurality of past learned tasks to match a data distribution of new task data in the embedding space.

13. The computer program product as set forth in claim 11, wherein the embedding space is invariant with respect to any learned task, such that new task data does not interfere with remembering any past learned task.

14. The computer program product as set forth in claim 11, wherein the one or more processors further perform an operation of using a Sliced Wasserstein Distance metric to force the new task data and the plurality of past learned tasks to share the data distribution in the embedding space.

15. The computer program product as set forth in claim 11, wherein the shared generative data distribution is a multi-modal distribution modeled as a Gaussian mixture model.

* * * * *